Patented Apr. 13, 1926.

1,580,425

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

MOLDING COMPOSITION CONTAINING ORGANOMAGNESIUM COMPOUNDS.

No Drawing.   Application filed June 25, 1923. Serial No. 647,756.

*To all whom it may concern:*

Be it known that I, CARLETON ELLIS, a citizen of the United States, and a resident of Montclair, in the county of Essex and State of New Jersey, have invented certain new and useful Improvements in Molding Compositions Containing Organomagnesium Compounds, of which the following is a specification.

This invention relates to resinous products and particularly to molding compositions made therefrom.

The invention will be illustrated by the following procedure: 100 parts by weight of phenol and 28 parts of magnesium hydrate or approximately one equivalent of phenol to an equivalent of magnesium hydrate are mixed and 110 parts of aqueous formaldehyde of approximately 37 to 40 per cent strength are boiled together for a period of 90 minutes, preferably under a reflux condenser. It is not necessary to use a closed vessel or digestor as there is practically no loss of formaldehyde on heating and refluxing at atmospheric pressure. A solution is obtained which is thin when hot and of molasses-like to jelly-like consistency when cold. When prepared from phenol of good quality it is yellow in color. The solution will contain about 56 per cent of solid material as determined by drying in vacuo.

The course of the reaction involved in the above procedure is marked by a curious increase in alkalinity and then a recession in the alkaline content as determined by titration of filtered solutions. As a rule with phenol recession of alkalinity occurs after a maximum reached on boiling for about one hour.

The hot solution may then be mixed with a filler for example wood flour. Thus a quantity of wood flour equal in weight to the total solids of the solution is incorporated and the mass thoroughly mixed for a half hour to an hour. By applying the boiling solution to the wood flour an excellent effect is secured in that impregnation of the fibres occurs and molded articles of a desirable degree of translucency are obtained.

The mixture is then placed in a dryer as for example a vacuum pan or rotary vacuum dryer and the moisture removed.

For example when spread out in layers ½ inch thick in the pans of a vacuum dryer and the vacuum pan heated with wet steam approximately one hour is required for drying at a vacuum of 28 inches. A desirable control over the degree of drying is shown by having a thermometer bulb in the layer of material; when the temperature reaches about 90° the drying has progressed to a sufficient degree as a rule.

When removed from the dryer the material is liable to be lumpy and may be ground in a comminutor or pebble mill or any other suitable grinding device. Made according to the foregoing procedure some difficulty may arise from adhesion to the mold in hot pressing. This may be overcome by the addition of 1 per cent of aluminum palmitate to the composition and grinding in a ball mill for one hour. The aluminum palmitate used should pass 100 mesh screen. By flouring the particles of aluminum palmitate sticking difficulties are overcome.

The composition cures readily in a hot press at a temperature of 160–170° C. giving a light brown molded article which in thin sections is translucent. The fins caused by extrusion from the molds are unusually flexible and translucent. They may be broken away from the edges of the molded article very readily to yield a clean looking specimen. At the temperature mentioned from 2 to 6 minutes usually suffices for the curing period.

Besides being noteworthy for flowability, flexibility and translucency the product has the advantage of being relatively resistant to the action of boiling solutions of aqueous caustic alkalis which affect many other molded articles made with binders of a different character, including various synthetic binders.

In the case of cresol such as ordinary commercial mixtures of meta and paracresol the reaction appears to be somewhat more rapid than with the phenol. Thus boiling a mixture of 100 parts of the cresol, 27 parts of magnesium hydrate (vacuum dried hydrate) and 100 parts of ordinary aqueous formaldehyde solution of 37–40 per cent strength, the reaction advances so rapidly that in about 45 minutes time the solution may be mixed with the filler and vacuum-dried. In this case a lesser tendency to stick to molds is observed than with the phenol resin and the use of aluminum palmitate, zinc stearate or similar substance may be dispensed with.

From the foregoing it will be noted that the preparation of the molding composition can be carried out in a few hours' time instead of resorting to the laborious operations heretofore employed in making certain synthetic resinous compositions. This is a great advantage in reducing labor costs and the cost of equipment required. The latter in any case may be of a very simple and inexpensive character, this is especially the case when drying is carried out at ordinary pressure instead of using a vacuum pan.

In place of aqueous formaldehyde it is possible to use paraform and water or other derivative of formaldehyde capable of reacting in like manner. Also the addition of other aldehydes of an appropriate character is not precluded. Instead of phenol or cresol, mixtures of phenolic bodies may be employed.

Various mineral fillers such as china clay, talc, asbestos and the like may be employed with or without sawdust or wood flour. The use of any specific filler does not form a part of the present invention as any of the fillers ordinarily used in the plastic molding industry are in most cases appropriate for the purpose. When using a filler of the cellulose type the organo magnesium compound present appears to have a desirable effect in the presence of water of impregnating and swelling the fibres to a degree which lends to the production of translucent articles. The proportion of filler may be varied widely and in the case of filler of the wood flour type, although I have indicated equal proportions of filler and binder in the first illustration I do not wish to be limited to such proportions but may use two or three times as much filler as binder in some cases. The use of an aqueous solution containing the organo magnesium compound apparently enables better penetration or impregnation which coupled with the flowability of the compound results in the possibility of using a major proportion of filler and particularly one to three parts of filler to one part of the binder. Owing to the cheapness of such filling material, the larger amount of filler used results in a corresponding cheapening in the cost of manufacture.

As indicated the entire procedure has been developed with the purpose of obtaining a process which would enable molding composition to be produced from the raw materials within the time of an ordinary working day. The present invention accomplishes this aim.

The period of boiling the reacting constituents should not be too protracted as molding compositions made from such products do not mold to form as good a surface. However the boiling may be carried out for a period of 2 hours or thereabouts without indication of any separation into two layers. The proportion of formaldehyde may be varied somewhat. A weight of aqueous 40 per cent formaldehyde approximately equal to the weight of phenol used is satisfactory but larger or smaller proportions of formaldehyde also may be used in some cases.

What I claim is:—

1. The process which comprises heating together approximately equal molecular proportions of phenol and magnesium hydroxide in the presence of aqueous formaldehyde of about 40 per cent strength, whereby a solution of reaction products is obtained which is thin and penetrating when hot and highly viscous when cold, in absorbing the hot solution in a mass of finely-divided filling material and removing the moisture therefrom.

2. The process which consists in heating together approximately equal molecular proportions of a phenolic body and a basic magnesium compound comprising magnesium hydroxide in the presence of at least a molecular proportion of formaldehyde in aqueous solution, whereby a solution of reaction products is obtained which is thin and penetrating when hot and highly viscous when cold.

3. A molding composition comprising the products of reaction of phenol, magnesium hydroxide and aqueous formaldehyde, all in approximately molecular combining proportions.

4. A molding composition comprising the products of reaction of a phenolic body, a basic magnesium compound comprising magnesium hydroxide and formaldehyde.

5. A process which consists in heating together a phenolic body and a basic magnesium compound comprising magnesium hydroxide in the presence of aqueous formaldehyde to produce a resin containing substance, and in absorbing such resin containing substance in a finely divided filler.

6. A process which comprises heating together a phenolic body and a basic magnesium compound containing magnesium hydroxide in the presence of aqueous formaldehyde to produce a resin containing substance, and in absorbing such resin containing substance in a finely divided filler of the cellulose type.

7. A process which comprises heating together a phenolic body and a basic magnesium compound comprising magnesium hydroxide in the presence of aqueous formaldehyde to produce a resin containing substance, absorbing such resin containing substance in a finely divided filler, drying the absorption product, and mixing it intimately with a mold lubricant.

8. A molding composition comprising the products of reaction of a phenolic body, a basic magnesium compound containing magnesium hydroxide and formaldehyde, absorbed in a finely divided filler.

CARLETON ELLIS.